US011963236B2

(12) United States Patent
del Carpio Vega et al.

(10) Patent No.: US 11,963,236 B2
(45) Date of Patent: Apr. 16, 2024

(54) PRIORITIZATION FOR RANDOM ACCESS

(71) Applicant: Telefonaktiebolaget LM Ericsson (publ), Stockholm (SE)

(72) Inventors: Luis Felipe del Carpio Vega, Espoo (FI); Zaib Zubair, Exeter (GB); Vicknesan Ayadurai, Sollentuna (SE); Divya Peddireddy, Gothenburg (SE); Eda Genc, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 433 days.

(21) Appl. No.: 17/283,777

(22) PCT Filed: Oct. 10, 2018

(86) PCT No.: PCT/EP2018/077633
§ 371 (c)(1),
(2) Date: Apr. 8, 2021

(87) PCT Pub. No.: WO2020/074077
PCT Pub. Date: Apr. 16, 2020

(65) Prior Publication Data
US 2021/0385878 A1     Dec. 9, 2021

(51) Int. Cl.
*H04W 4/00* (2018.01)
*H04W 72/0446* (2023.01)
(Continued)

(52) U.S. Cl.
CPC ... *H04W 74/0841* (2013.01); *H04W 72/0446* (2013.01); *H04W 74/0808* (2013.01); *H04W 74/0866* (2013.01)

(58) Field of Classification Search
CPC ......... H04W 74/0841; H04W 72/0446; H04W 74/0808; H04W 74/0866
(Continued)

(56) References Cited

U.S. PATENT DOCUMENTS 9,979,624 B1 *    5/2018   Volpe .................. H04L 43/0894
2003/0045288 A1 * 3/2003   Luschi ................ H04W 52/54
                                              455/434
(Continued)

FOREIGN PATENT DOCUMENTS

EP          1460809 A2       9/2004

OTHER PUBLICATIONS

Author Unknown, "IEEE Std 802.11-2016", IEEE Standard for Information Technology—Local and Metropolitan Area Networks—Specific Requirements, Part 11: Wireless LAN MAC and PHY Specifications, Section 10. MAC sublayer functional description, 2016, pp. 1295-1403.
(Continued)

*Primary Examiner* — Chuong T Ho
(74) *Attorney, Agent, or Firm* — Murphy, Bilak & Homiller, PLLC

(57) ABSTRACT

A prioritization method for random access, comprising receiving one or more first packet flow for transmission, wherein the one or more first packet flow is assigned a respective access category queue, initiating a random access procedure for the first packet flow, receiving a packet of a second packet flow for transmission, wherein the second packet flow is assigned an access category queue having priority over the access category queue assigned to the first packet flow, issuing an indication configured to interrupt the random access procedure for the first packet flow, and performing a random access procedure for the received packet of the second packet flow wherein idle time slots previously sensed by the random access procedure for the first packet flow are considered as sensed also for the random access procedure for the second packet flow. Corresponding apparatus and computer program product are also disclosed.

22 Claims, 9 Drawing Sheets

(51) Int. Cl.
   *H04W 74/08*     (2009.01)
   *H04W 74/0808*   (2024.01)
   *H04W 74/0833*   (2024.01)

(58) Field of Classification Search
   USPC .................................... 370/329, 330, 328
   See application file for complete search history.

(56) References Cited

U.S. PATENT DOCUMENTS

| | | | |
|---|---|---|---|
| 2007/0195787 A1 | 8/2007 | Alnuweiri et al. | |
| 2011/0122805 A1 | 5/2011 | Abraham et al. | |
| 2012/0051342 A1* | 3/2012 | Liu | H04W 72/56 370/338 |
| 2012/0127874 A1 | 5/2012 | Oh et al. | |
| 2016/0066208 A1* | 3/2016 | Baron | H04W 74/085 370/230 |
| 2016/0330753 A1* | 11/2016 | Jauh | H04W 28/065 |
| 2016/0359653 A1* | 12/2016 | Lee | H04L 5/0023 |
| 2018/0332627 A1* | 11/2018 | Chitrakar | H04W 72/566 |
| 2020/0351944 A1* | 11/2020 | Wang | H04W 52/36 |

OTHER PUBLICATIONS

Balakrishnan, Manikanden, et al., "CP-EDCA Analysis under Realistic Wireless Channel Conditions", Military Communications Conference, MILCOM 2009, Paper ID#901398, IEEE, Piscataway, NJ, USA, Oct. 2009, 1-6.

Balakrishnan, Manikanden, et al., "Service Preemptions for Guaranteed Emergency Medium Access in Wireless Sensor Networks", Military Communications Conference, MILCOM 2008, IEEE, Piscataway, NJ, USA, Nov. 2008, 1-7.

Farkas, János, "Introduction to IEEE 802.1", Focus on the Time Sensitive Networking Task Group, presentation, May 15, 2017, 1-50.

Qualcomm Incorporated, "FS_5GLAN: Time Sensitive Networking (TSN) Discussion Paper", 3GPP TSG-SA WG1 Meeting #80, S1-174199, (revision of S1-17xxxx), Reno, USA,, Nov. 27-Dec. 1, 2017, 1-17.

Tian, Xuejun, et al., "SRAP: Scheduled Random Access Protocol Achieving High Throughput and Traffic Adaptivity in WLANs", Proceedings of the Third International Conference on Wireless and Mobile Communications (ICWMC'07), IEEE Computer Society, 2007, 1-6.

\* cited by examiner

PRIORITIZATION FOR RANDOM ACCESS

TECHNICAL FIELD

The present disclosure relates generally to the field of random access. More particularly, it relates to a prioritization method for random access and an apparatus for prioritization in a random access procedure.

BACKGROUND

Time-Sensitive Networking (TSN) is as an enhanced Ethernet technology which provides guaranteed data transport with bounded low latency, low delay variation, and extremely low loss. TSN includes a set of components such as Synchronization, Reliability, Latency and Resource Management. TSN technology is expected to be an enabler for industrial automation. Further information regarding this can be found in IEEE Standards Association, Time-Sensitive Networking (TSN) for Industry 4.0.

A type of traffic present in industrial application is periodic traffic, for example, in process automation where sensor reports, and actuation commands are created periodically. When serving periodic traffic, the TSN system reduces the delay variation (i.e. jitter) of served packets.

Packet preemption works by stopping a frame transmission on the wire, replace it with a priority transmission and then resume the original stopped frame transmission, further information regarding this can be found in Introduction to IEEE 802.1, Focus on the Time-Sensitive Networking Task Group, May 15, 2017.

Wireless Local Area Network (WLAN), commonly known as Wi-Fi, is a wireless communication system operating in ISM (Industrial Scientific and Medical) bands. It is usually deployed as a star system where the Access Point (AP) is a device having a coordinator node (role) and the stations (STAs) are associated to APs. The AP maintains a Basic Service Set (BSS) to where STAs are associated. The WLAN system uses the Hybrid Coordination Function (HCF) which defines the Enhanced Distributed Channel Access (EDCA). The EDCA allows STAs to get access to the wireless medium (WM) via a random access procedure based on CSMA/CA. This procedure is an example of a listen-before talk procedure.

In the IEEE 802.11ax, data from STAs can be polled by the AP via trigger frames. In this case, the random access procedure is carried out at the AP, and STAs reply to the trigger frames if they have been scheduled explicitly. IEEE 802.11ax also allows multi-user UL access via Orthogonal Frequency-Division Multiple Access (OFDMA) where multiple STAs can reply to the same trigger frame on orthogonal frequency resources. There are also trigger frames for common access which allows STAs to compete for orthogonal frequency resources via the OFDMA random access back-off (OBO). Trigger frames for explicit access and common access can be carried by the same physical packet.

Different EDCA parameters give more or fewer chances to complete the random access fast depending on the category of the traffic. If the wireless medium is found idle (i.e. free) during the Arbitration IFS (AIFS) time, the second stage based on back-off starts. The Back-off (BO) time is computed by multiplying the number of back-off slots computed by taking a random value from a uniform distribution between [0, CW] with the slot time, where CW is a value between [aCWmin, aCWmax]. A new value for the back-off counter is computed only when the previous value of the counter is zero. The back-off counter decreases as the wireless medium (WM) is found idle (i.e. free) during each back-off slot. Finally, when the back-off counter reaches zero, the STA can transmit one or more wireless frames for the duration of the transmission opportunity (TXOP) without further contention. If the wireless medium was found busy during the back-off process, the BO counter stops, and its value is kept. One more time, the first random access stage begins.

Contention free access is possible in WLAN systems as specified in the Point Coordination Function (PCF) and by the HCF controlled channel access (HCCA). In short, a random access is needed to send the frame which indicates the begging of the contention free period (CFP). Within the CFP, the access point (AP) polls STAs for transmission.

In emergency communications, there are techniques aimed at prioritizing emergency packets/transmission. For example, given a granted TXOP in EDCA access which is used to transmit a contention free burst (CFB), an emergency service can use preemption to transmit one or more emergency packets in a TXOP/CFB not originally granted to it in detriment of other packets that would have been otherwise served. In other words, the original contention free burst is interrupted (preempted) by the emergency service and a burst of emergency packets can be transmitted. Also, different parameters for EDCA parameters can be configured to assure IFS timings that are shorter for emergency services which will reduce the collision probability with non-emergency packets. Hence, the random access processes for all access categories queues are stopped simultaneously due to wireless channel being busy or during Network Allocation Vector (NAV) timer operation regardless of the priority level of the queued packets. After a while, when the channel is idle again, the random access processes of all the access categories start competition. All in all, the queue with the highest priority might not get served first due the randomness of the random access procedure.

Therefore, there is a need for providing an enhanced prioritization of queued packets in a random access procedure.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

According to a first aspect, this is achieved by a prioritization method for random access. More specifically, the method comprises receiving one or more first packet flow for transmission, wherein the one or more first packet flow is assigned a respective access category queue and initiating a random access procedure for the first packet flow. The method further comprises receiving a packet of a second packet flow for transmission, wherein the second packet flow is assigned an access category queue having priority over the access category queue assigned to the first packet flow, issuing an indication configured to interrupt the random access procedure for the first packet flow, and performing a random access procedure for the received packet of the second packet flow wherein idle time slots previously sensed by the random access procedure for the first packet flow are considered as sensed also for the random access procedure for the second packet flow.

In some embodiments, the issuing the indication configured to interrupt the random access procedure of the first packet flow is responsive to receiving the packet of the second packet flow.

In some embodiments, the method further comprises performing additional channel sensing if further idle time slots are needed.

In some embodiments, the performing the random access procedure for the received packet of the second packet flow further comprises determining a number of time slots required to be idle during a time interval before a back-off time for the random access procedure for the second packet flow and obtaining a number of idle time slots previously sensed by the random access procedures for the first packet flow and decrementing the number of time slots required to be idle by the number of idle time slots previously sensed.

In some embodiments, the performing the random access procedure for the received packet of the second packet flow further comprises determining a number of time slots for a back-off counter of the second packet flow, decrementing from the number of time slots for the back-off counter by remaining sensed idle time slots, incrementing the back-off counter value of the first packet flow with the number of time slots used to decrement the random access procedure for the second packet flow, and continuing decrement of the back-off counter value of the second packet flow when sensed time slot is considered as idle, and granting a transmission opportunity when the back-off counter value of the second packet flow is zero.

In some embodiments, the performing the random access procedure for the received packet of the second packet flow further comprises limiting the increment of the back-off counter of the random access procedure for the first packet flow by the maximum number of time slots previously sensed idle.

In some embodiments, the channel sensing comprises a Listen-before-talk, LBT, procedure or a Clear Channel Assessment, CCA, procedure.

In some embodiments, the method further comprises resuming random access procedures for the first packet flows once the second packet flow has been processed.

In some embodiments, the random access comprises contention based access.

In some embodiments, the packet flows originate from a time sensitive networking, TSN, traffic flow.

In some embodiments, the method is implemented in a Wireless Local Area Network, WLAN, radio network.

According to a second aspect, this is achieved by a prioritization method for random access. More specifically, the method comprises receiving a packet of a second packet flow for transmission, wherein the second packet flow is assigned an access category queue having priority over an access category queue assigned to a first packet flow, performing only a random access procedure for the received packet of the second packet flow, receiving one or more first packet flow and preventing interruption by the received one or more first packet flow of the random access procedure for the received packet of the second packet flow.

A third aspect is a computer program product comprising a non-transitory computer readable medium, having thereon a computer program comprising program instructions. The computer program is loadable into a data processing unit and configured to cause execution of the method according to the first aspect and/or second aspect when the computer program is run by the data processing unit.

A fourth aspect is an apparatus for prioritization in a random access procedure. More specifically, the apparatus comprises controlling circuitry configured to cause reception of one or more first packet flow for transmission, wherein the one or more first packet flow is assigned a respective access category queue, a random access procedure for the first packet flow, reception of a packet of a second packet flow for transmission, wherein the second packet flow is assigned an access category queue having priority over the access category queue assigned to the first packet flow, issuance of an indication configured to interrupt the random access procedures for the first packet flow, and a random access procedure for the received packet of the second packet flow wherein idle time slots previously sensed by the random access procedure for the first packet flow are considered as sensed also for the random access procedure for the second packet flow.

A fifth aspect is an apparatus for prioritization in a random access procedure. More specifically, the apparatus comprises controlling circuitry configured to cause reception of a packet of a second packet flow for transmission, wherein the second packet flow is assigned an access category queue having priority over an access category queue assigned to a first packet flow, a random access procedure for only the received packet of the second packet flow, reception of one or more first packet flow, and prevention of interruption by the received one or more first packet flow of the random access procedure for the received packet of the second packet flow.

A sixth aspect is a communication device comprising the apparatus according to any of the fourth and fifth aspects. More specifically, the communication device is one or more of a network node, an access point, AP, in a WLAN radio network, an end device.

In some embodiments, any of the above aspects may additionally have features identical with or corresponding to any of the various features as explained above for any of the other aspects.

An advantage of some embodiments is reducing competition between queues in contention based access for radio resources which is specified in the EDCA procedure of WLAN.

Another advantage of some embodiments is reducing the random access time for priority packets and allowing more opportunities for priority packets to get served on time.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
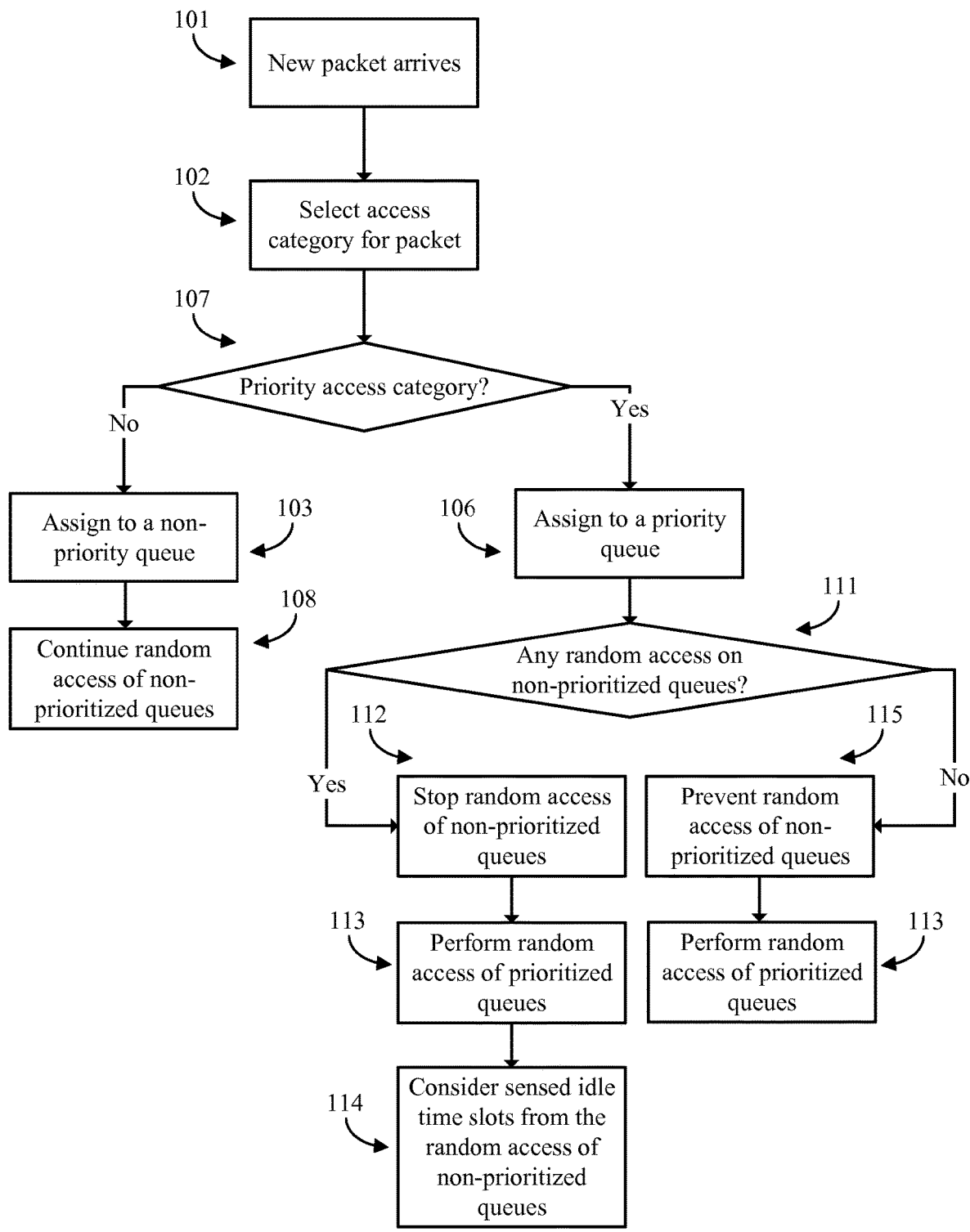
FIG. 1 is a flowchart illustrating example method steps according to some embodiments.

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Random access based on the Hybrid Coordination Function (HCF) process is divided in two-time stages. In each stage, the Wireless Medium (WM) is sensed on a time slot granularity using the Clear Channel Assessment (CCA) procedure. In the first stage, an Inter-Frame Space (IFS) time is selected based on a traffic's access category following the EDCA access, this is called Arbitration IFS (AIFS) as mentioned above.

The AIFS[AC] is computed as follows:

$$AIFS[AC]=SIFS+AIFSN[AC]*aSlotTime \quad (eq.\ 1)$$

wherein SIFS is defined as 16 μS in IEEE 802.11a/n/ac/ax physical layer definitions, AIFSN is defined as 7 for AC_BK, 3 for AC_BE, 2 for AC_VO and AC_VI as default values in IEEE 802.11 MAC definition and 1 or 0 can be defined for AC_PRIO. These values can be changed and adjusted during system operation. An aSlotTime is defined as 9 μS in IEEE 802.11a/n/ac/ax physical layer definitions. Other IEEE 802.11 physical and MAC layer definitions may define different values than the above mentioned.

As explained above in the Background section, different EDCA parameters give more or fewer chances to complete the random access fast depending on the category of the traffic. If the wireless medium is found idle (i.e. free) during the Arbitration IFS (AIFS) time, the second stage based on back-off starts. The Back-off (BO) time is computed by multiplying the number of back-off slots computed by taking a random value from a uniform distribution between [0, CW] with the slot time, where CW is a value between [aCWmin, aCWmax]. A new value for the back-off counter is computed only when the previous value of the counter is zero. The back-off counter decreases as the wireless medium (WM) is found idle (i.e. free) during each back-off slot. Finally, when the back-off counter reaches zero, the STA can transmit one or more wireless frames for the duration of the transmission opportunity (TXOP) without further contention. If the wireless medium was found busy during the back-off process, the BO counter stops, and its value is kept. One more time, the first random access stage begins.

In the following, embodiments will be described where random access for certain access category queues are either selectively interrupted or prevented in order to prioritize access category queues with priority packets. In addition, the counted idle time slots of the BO counters of the interrupted access categories are considered as sensed in favor of the BO counter of the packets of the prioritized access categories in order to reduce the random access time of priority packets. Furthermore, embodiments will be described where priority packets originate from a TSN traffic flow and considering a Wi-Fi radio network, a STA or an AP has a mechanism to identify priority packets (as seen in e.g. FIG. 5).

FIG. 1 is a flowchart illustrating example method steps according to some embodiments. More specifically, FIG. 1 illustrates in step 101 receiving of a packet and in step 102 assigning (i.e. selecting) of an access category to the received packet. In step 107, it is determined if the assigned access category is prioritized, in case it is determined that the assigned access category is not prioritized it is assigned a non-priority access category queue in step 103 and the random access of the non-prioritized queues continues in step 108. In case it is determined in step 107 that the assigned access category is prioritized it is assigned a priority access category queue in step 106. Once, it has been determined that the received packet is prioritized and it is assigned a priority access queue in step 106, there is a determination in step 111 to determine if any random access process on non-prioritized access category queues are ongoing. If any ongoing random access process on non-prioritized access category queues are ongoing (i.e. yes), in step 112, interrupting (i.e. stopping) these in order to prioritize the priority access category queue for random access. When the random access processes are interrupted for the non-prioritized access category queues, a random access process is performed for the prioritized access category queue in step 113 and in step 114 the sensed idle time slots by the random access processes of the non-prioritized access category queues are considered as sensed also for the random access process for the prioritized access category queue. If it is determined in step 111 that there are no ongoing random access processes ongoing for non-prioritized access category queues then in step 115 any random access processes on non-prioritized access category queues are prevented by either setting a Boolean flag to TRUE for the non-prioritized access category queues such that random access cannot be started for these queues or setting the wireless medium in an artificially busy state while the prioritized access category queue is served such that random access on any other queues is prevented. In step 113 following step 115, a random access process is performed for the prioritized access category queue.

Figure 2A:
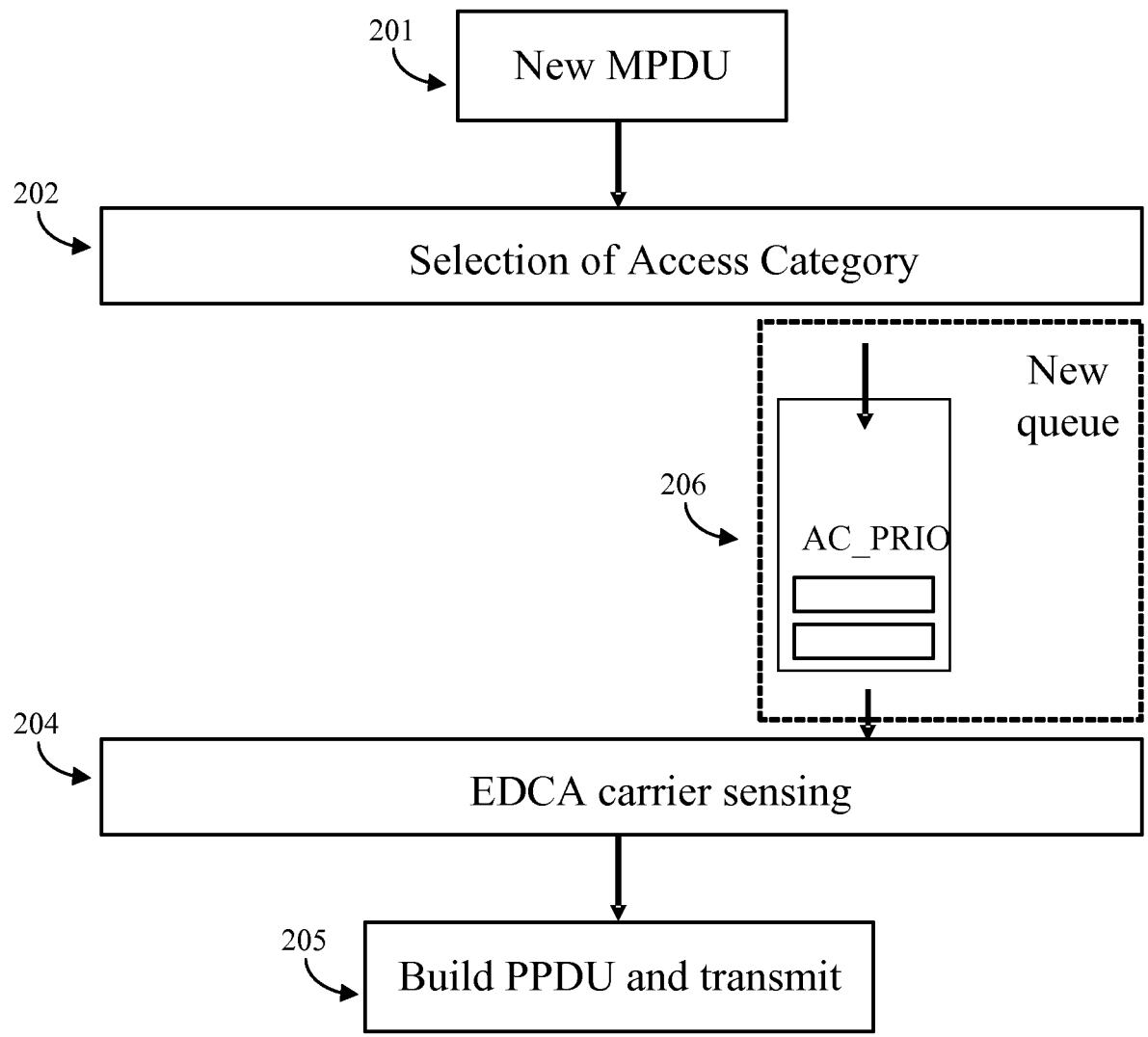
FIG. 2a-c are schematic drawings illustrating example principles according to some embodiments.

FIG. 2a is a schematic drawing illustrating example principles according to some embodiments. More specifically, FIG. 2a illustrates reception of packets from Mac Protocol Data Unit (MPDU) 201 and wherein the received packets are assigned (i.e. selected) an access category queue 202. In case of EDCA, received packets are assigned to a prioritized access category queue AC_PRIO 206 for EDCA random access. FIG. 2a further illustrates the prioritized access category participating in EDCA carrier sensing 204 (i.e. including internal collision resolution) and building PPDU and transmitting 205.

Figure 2B:
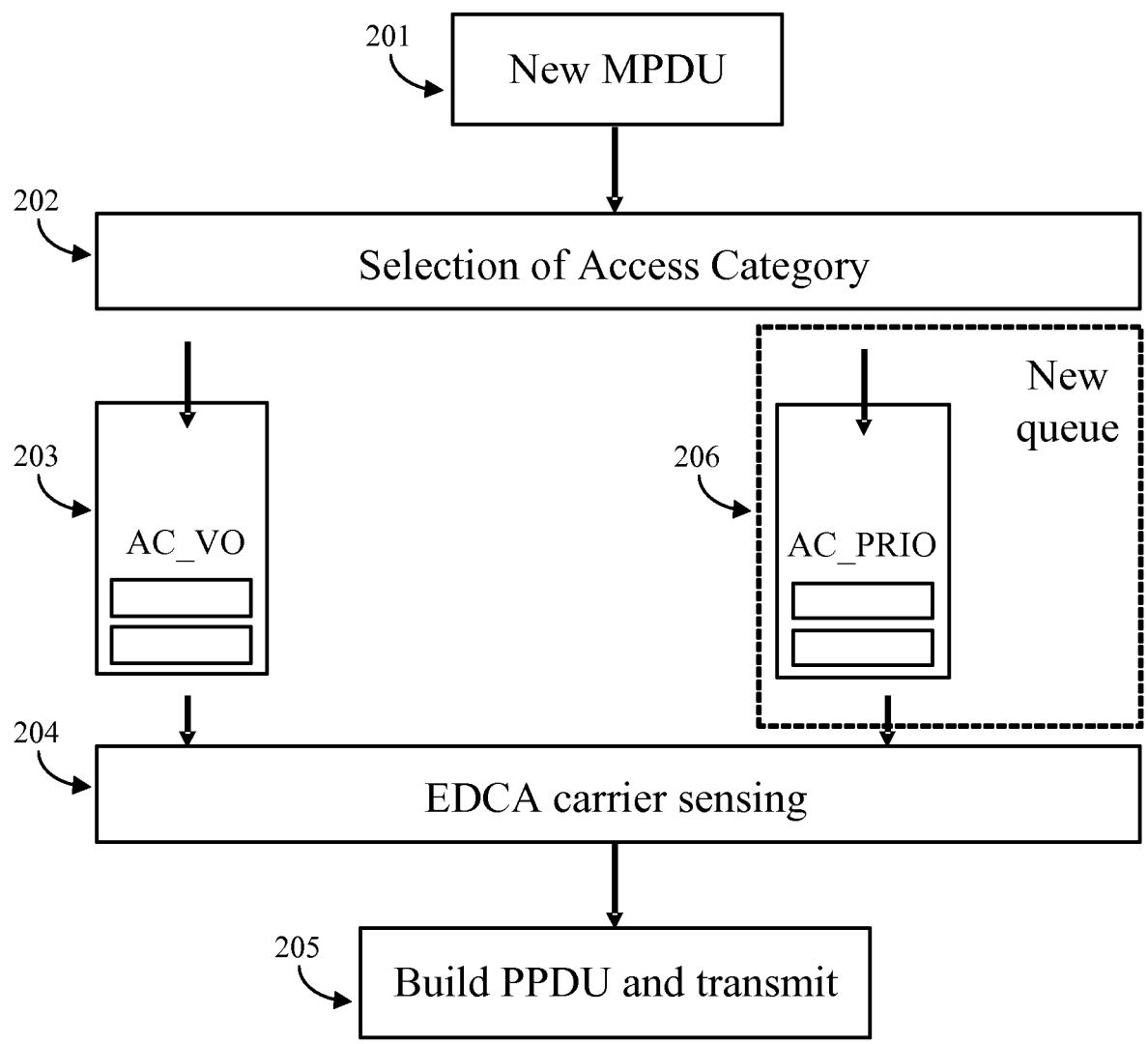

FIG. 2b is a schematic drawing illustrating example principles according to some embodiments. More specifically, FIG. 2b illustrates reception of packets from MPDU 201 (compare with step 201 of FIG. 2a) and wherein the received packets are assigned (i.e. selected) an access category queue 202 (compare with step 202 of FIG. 2a). In case of EDCA, received packets are assigned to either one defined access category: e.g. voice AC_VO 203 or a prioritized access category queue AC_PRIO 206 (compare with step 206 of FIG. 2a) wherein prioritized packets are assigned for EDCA random access. FIG. 2b further illustrates the two access category queues participating in EDCA carrier sensing 204 (compare with step 204 of FIG. 2a) (i.e. including internal collision resolution) and building PPDU and transmitting 205 (compare with step 205 of FIG. 2a).

Figure 2C:
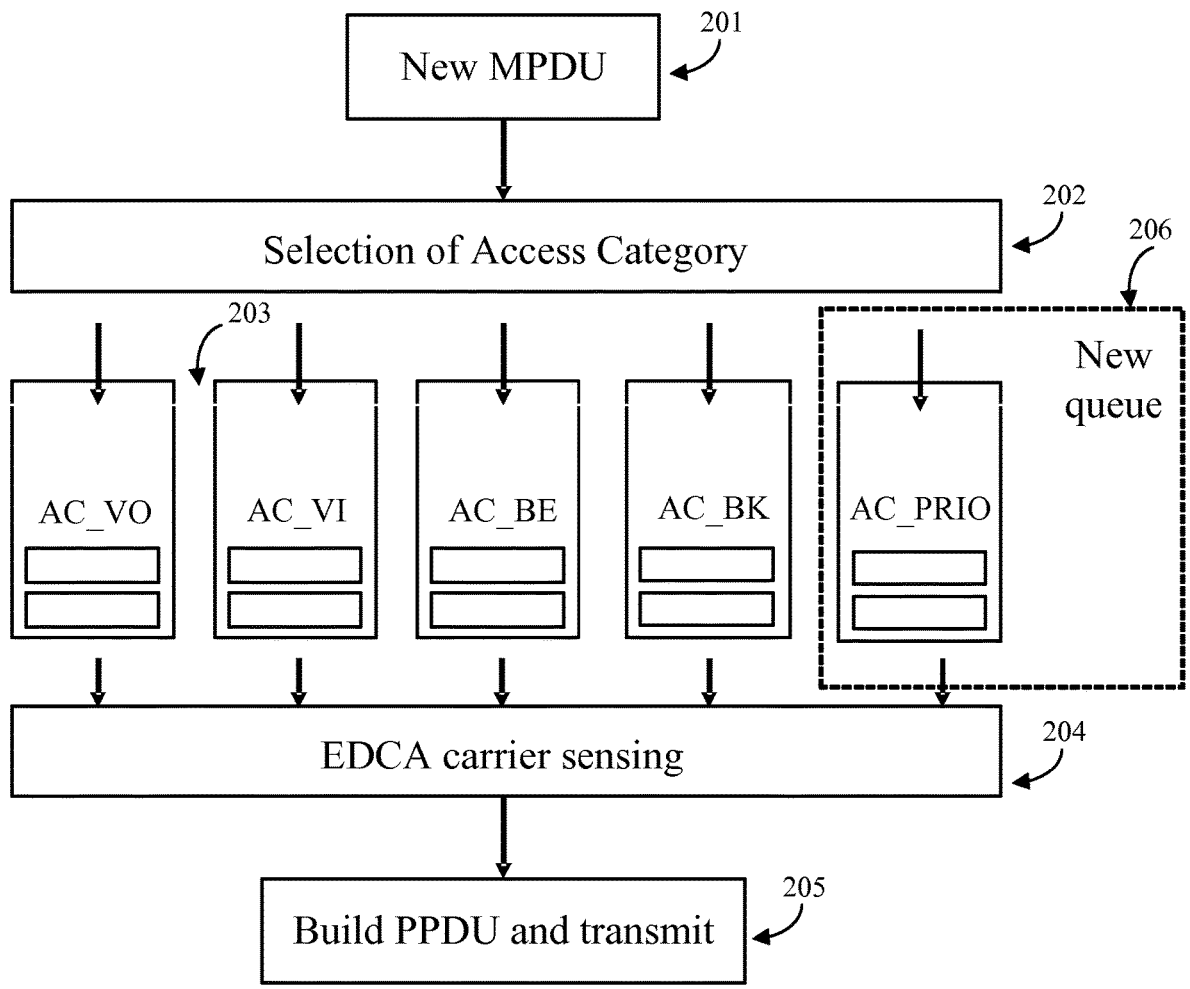

FIG. 2c is a schematic drawing illustrating example principles according to some embodiments. More specifically, FIG. 2c illustrates reception of packets from MPDU 201 (compare with step 201 of FIGS. 2a and 2b) and wherein the received packets are assigned (i.e. selected) an access category queue 202 (compare with step 202 of FIGS. 2a and 2b). In case of EDCA, there may typically be four defined access categories queues: background AC_BK, best effort AC_BE, video AC_VI, and voice AC_VO 203 (compare with step 203 of FIG. 2b) as assignable access categories queues for EDCA random access and a prioritized access category queue AC_PRIO 206 wherein prioritized packets are assigned for EDCA random access. FIG. 2c further illustrates the five access categories queues participating in EDCA carrier sensing 204 (compare with step 204 of FIGS. 2a and 2b) (i.e. including internal collision resolution) and building PPDU and transmitting 205 (compare with step 205 of FIGS. 2a and 2b).

Figure 3:
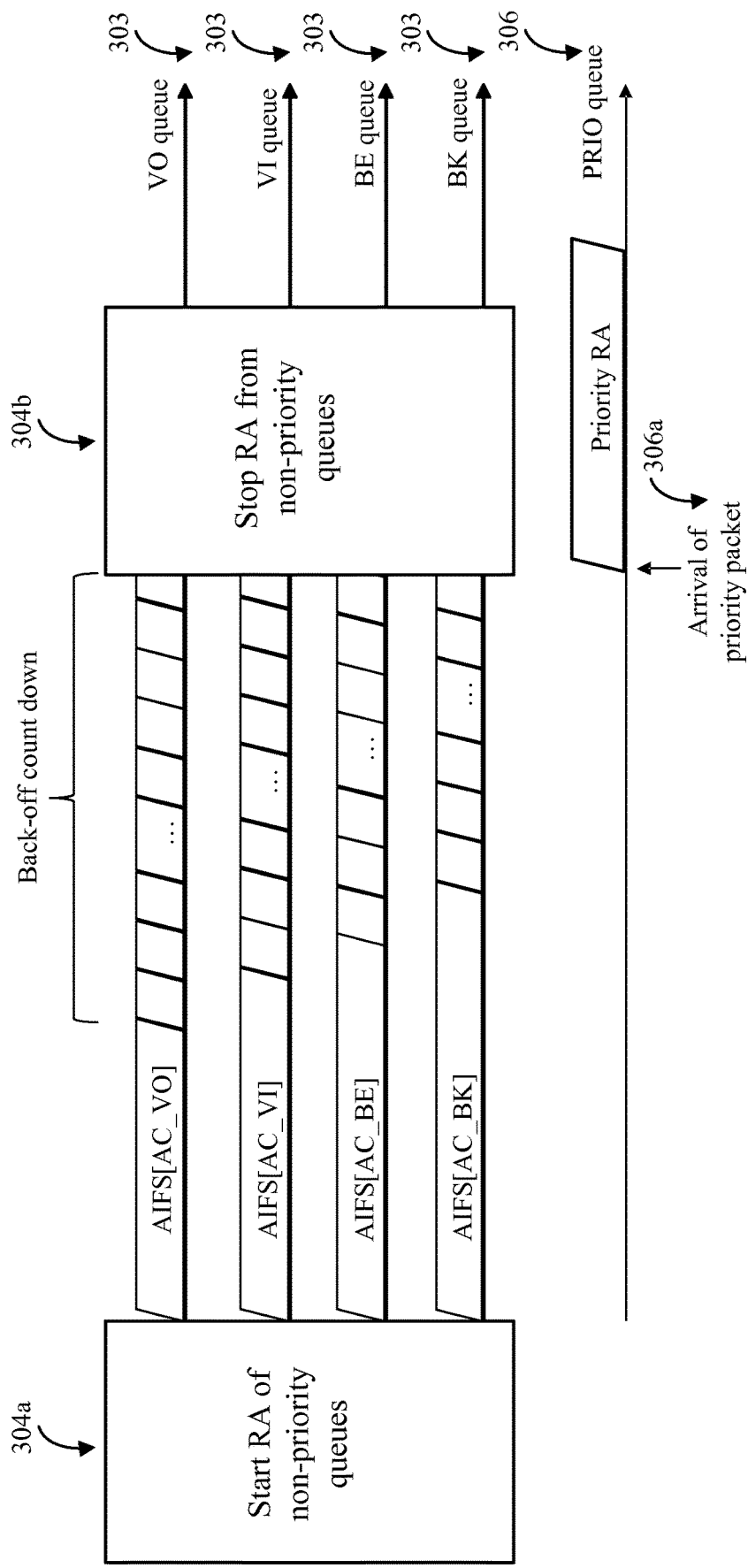
FIG. 3 is a schematic timing diagram illustrating example events according to some embodiments.

FIG. 3 is a schematic timing diagram illustrating example events according to some embodiments. More specifically, FIG. 3 illustrates the four defined access category queues 303 (compare with 203 of FIGS. 2a-c) participating in the EDCA random access mechanism in time domain which in contention based access is a competition of radio resources between the access category queues 303 (compare with 203 of FIGS. 2a-c). FIG. 3 illustrates start of random access of non-prioritized access category queues 304a and stop of random access of non-prioritized access category queues 304b at arrival of a priority packet 306a assigned to a priority access category queue 306 (compare with 206 of FIGS. 2a-c). FIG. 3 further illustrates the arrival of the priority packet which interrupts (i.e. stops) the random access process of the other non-prioritized access category queues i.e. VO, VI, BE, BK queues 303 (compare with 203 of FIGS. 2a-c) instead of allowing all queues in contention based access to compete for radio resources and thereby risk the prioritized access category queue to not be served in time.

Figure 4:
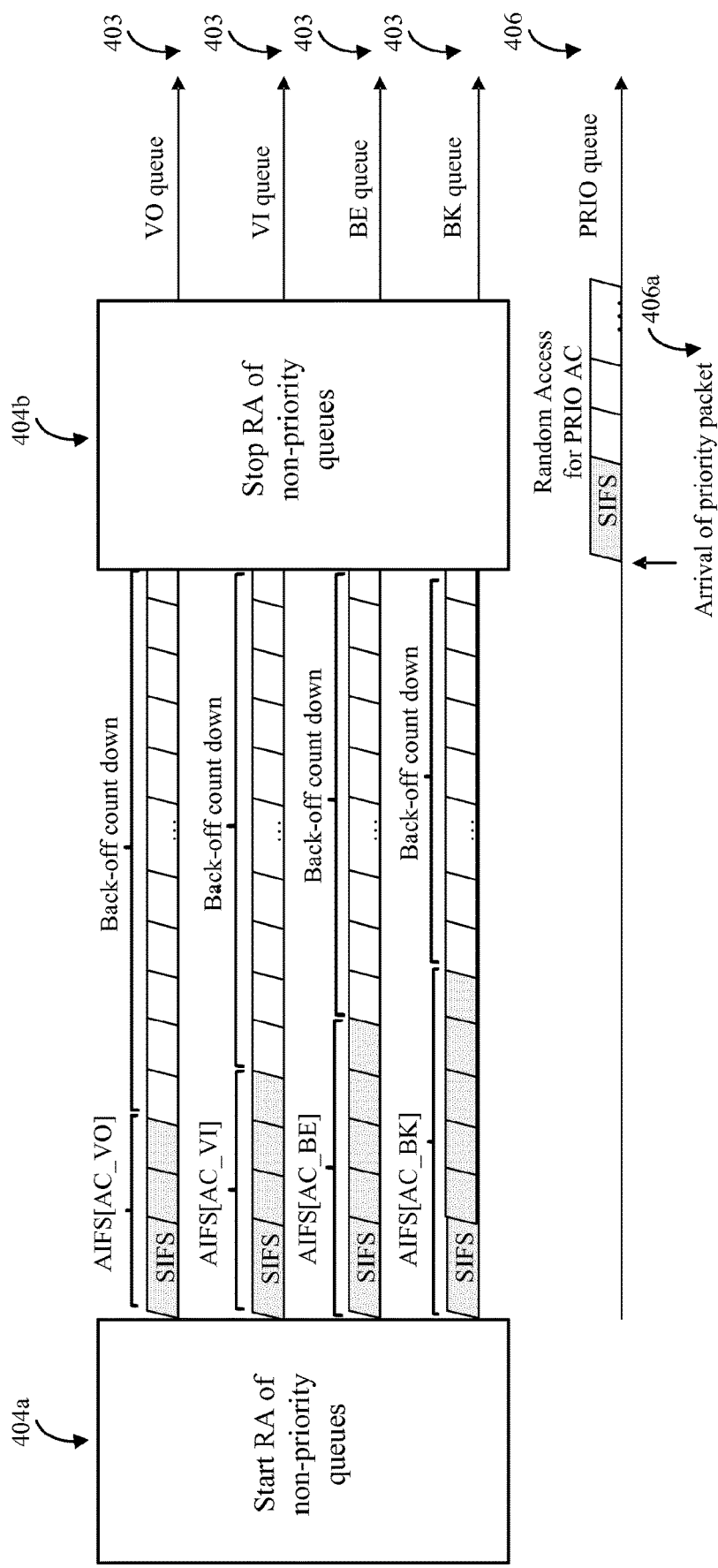
FIG. 4 is a schematic timing diagram illustrating example events according to some embodiments.

FIG. 4 is a schematic timing diagram illustrating example events according to some embodiments. More specifically, FIG. 4 illustrates the four defined access category queues 403 participating in the EDCA random access mechanism in a time domain which in contention based access is a competition of radio resources between the access category queues. FIG. 4 illustrates start of Random Access of non-prioritized access category queues 404a and stop of random access of non-prioritized access category queues 404b at arrival of a priority packet 406a assigned to a priority access category queue 406 (compare with 206 of FIGS. 2a-c and 306 of FIG. 3). FIG. 4 further illustrates the composition of the random access by illustrating the slots explicitly. Consequently, the method steps compare how many time slots were already sensed as idle during the interrupted (i.e. stopped) random access procedure, say N. The value N includes the number of time slots sensed idle both during AIFS and Back-off. Furthermore, the Short Interframe Space (SIFS) sensing time is independent of the number of time slots as showed in eq. 1:

$$AIFS[AC]=SIFS+AIFSN[AC]*aSlotTime \qquad (eq. 1)$$

Thus a SIFS needs to be sensed idle (i.e. free).

After sensing the wireless medium as idle (i.e. free) during SIFS, the following conditions are used:
  If N is equal or higher than M (for the priority packet, let us define, M as: M=AISFN[PRIO]), then first stage of sensing is considered complete for the priority queue. Otherwise, (M-N) need to be sensed idle before beginning the second stage.

The second stage begins by calculating the number of back-off slots for the priority access category as defined in WLAN, let L be the initial value of the back-off counter for the priority access category. One more time, using the rest of the already sensed slots we compute:
  if (N-M) is higher than zero, then R=L-(N-M), otherwise R=L.
  if R is larger than zero, then set R to the back-off counter of the priority queue and begin back-off process. Otherwise, if R is zero or less, the priority queue is granted a TXOP and wireless transmission can begin.

Because the previously (i.e. the original) sensed slots are reused for the priority back-off process, we increase the back-off counters of the stopped queues by the same number of slots that were used to accelerate the priority back-off process.
  If L-(N-M) is less than or equal to zero, increase M+L to the non-priority back-off counters. Otherwise, increase N to the back-off counters.

A numerical example is given next. Consider that a back-off process for video category is running, where AIFSN[AC_VI]=3, the initial value (computed from a uniform distribution) for the back-off number is 5. The AIFS has finished and 3 BO slots were measured idle (i.e. free) during the back-off process so far. Then, a priority packet arrives to the STA and the priority access category becomes active. The video category AC_VI back-off process stops having N=3+3=6 slots already measured as idle (i.e. free).

Considering that the AIFSN[PRIO]=M=2, then clearly N>M which means that AIFS is considered complete if during an SIFS time the medium is sensed idle. Let's assume that the back-off counter value for the priority access category is L=3. It follows N-M=4>0, so R=L-(N-M)=3-(4) =-1. As R is less than zero, the back-off is considered complete and the TXOP is granted for the priority access category immediately.

Finally, the back-off counter for the video access category is increased by the number of reused slots, M+L=5.

Therefore, FIG. 4 illustrates that it is possible to interrupt (i.e. stop) the channel sensing in both IFS phase and Back-off phase. Another example is where the arrival of a priority packet interrupts (i.e. stop) the random access process of the non-priority queues: VO, VI, BE, BK.

The AIFS[AC] as defined in (eq. 1) indicates that the number of slots that need to be sensed idle (i.e. free) within AIFS[AC] is equal to the AIFSN[AC] number which is given as an access category specific parameter and can be changed by the access point.

Figure 5:
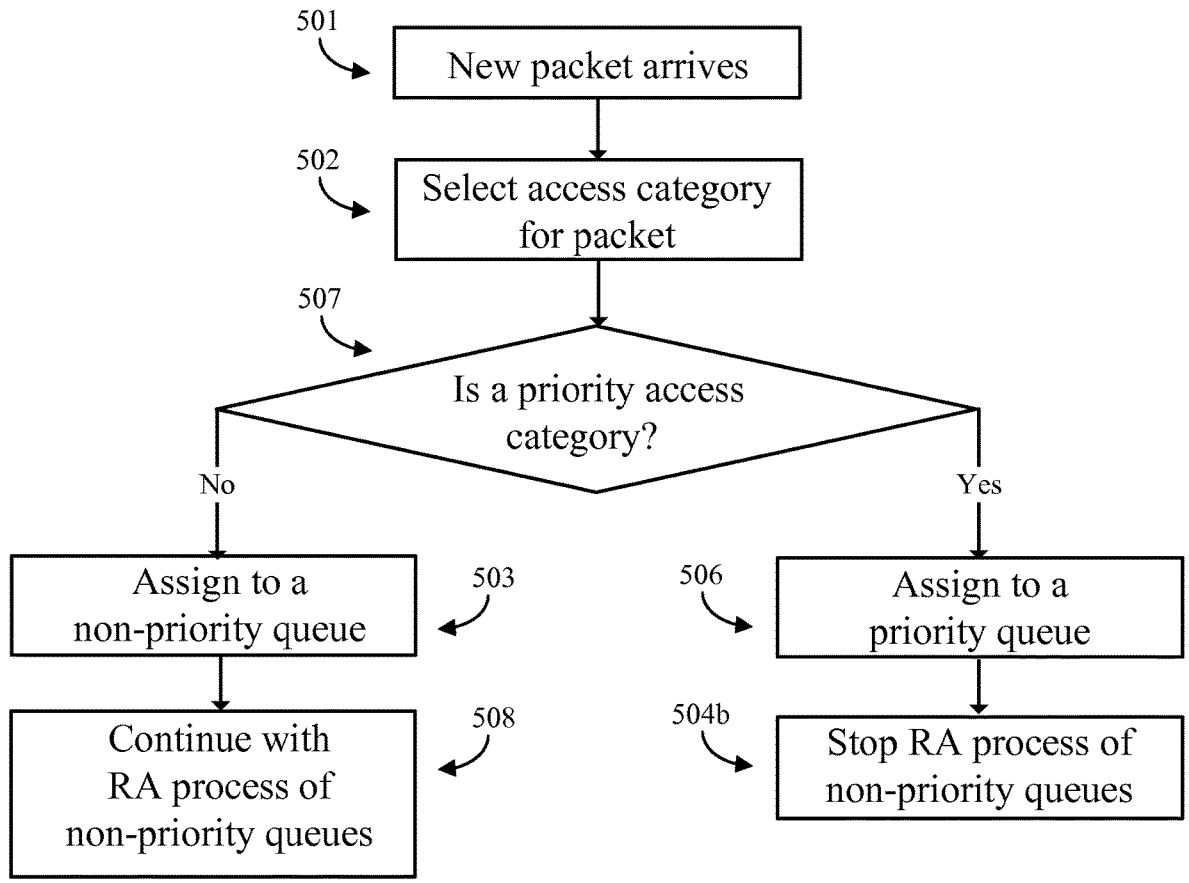
FIG. 5 is a flowchart illustrating example method steps according to some embodiments.

FIG. 5 is a flowchart illustrating example method steps according to some embodiments.

More specifically, FIG. 5 illustrates in step 501 arrival of a new packet and in step 502 an assigning (i.e. selection) of access category for the new packet wherein the assigning of access category is based on methods such as packet analyzing, flow identification, reading application headers, pre-configuration etc. and priority packets. In step 507, the assigned access category for the new packet is assigned to either a non-priority queue or to a priority queue. In step 503, the new packet has been assigned to the non-priority queue and in step 508 the random access procedure is continued. In step 506, the new packet has been assigned to the priority queue and in step 504b the random access procedure of the non-priority queues is interrupted (i.e. stopped).

Figure 6:
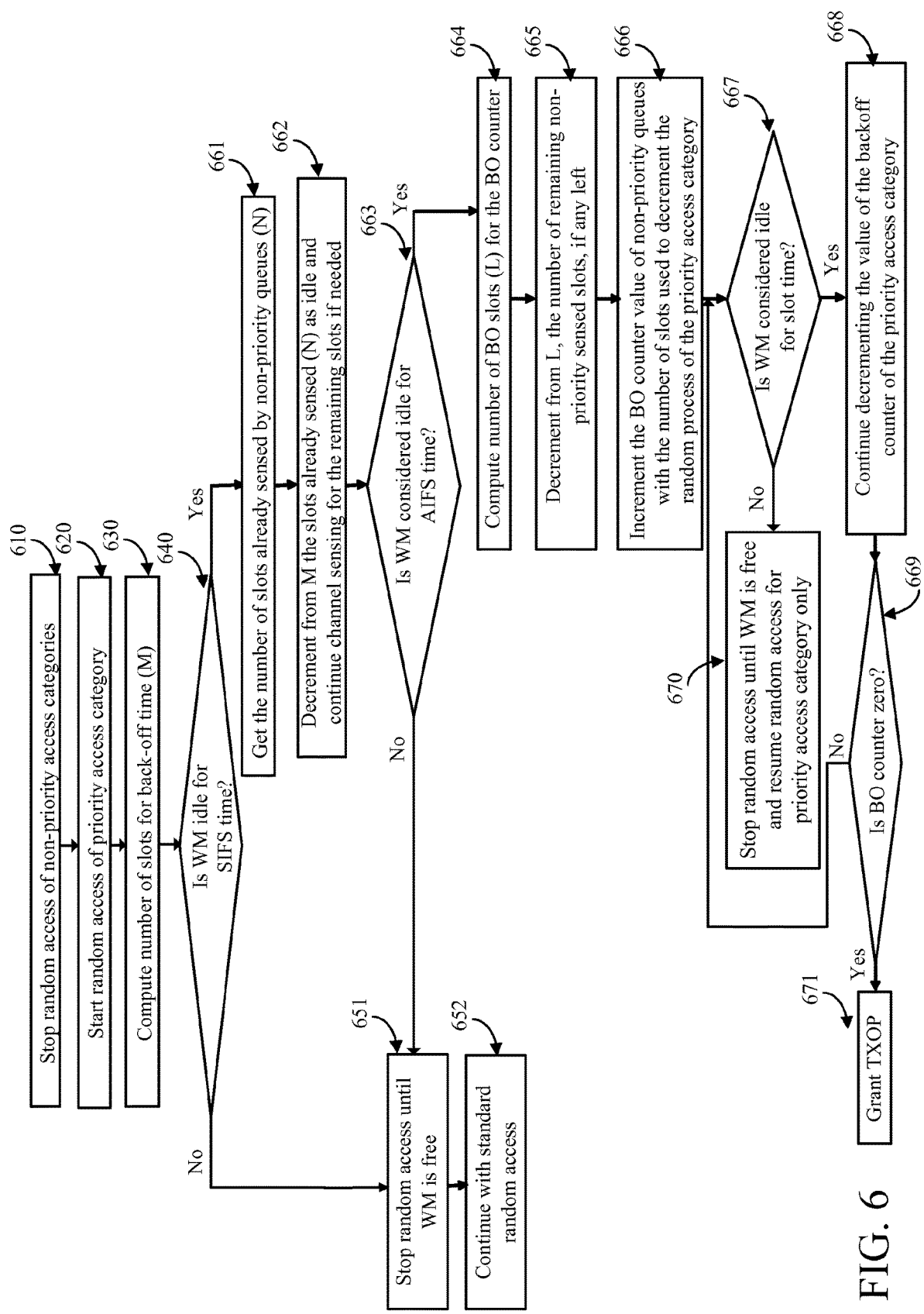
FIG. 6 is a flowchart illustrating example method steps according to some embodiments.

FIG. 6 is a flowchart illustrating example method steps according to some embodiments. More specifically, FIG. 6 illustrates in step 610 after arrival of a new packet with a priority access category queue issuing to stop (i.e. sending an indication to interrupt) random access of non-priority access category queues. In step 620, starting random access on a priority access queue and in step 630, computing the number of time slots needed to be idle (i.e. back-off time) during AIFS time for the given configuration, say M slots. In step 640, it is determined if the wireless medium (WM) is idle for the SIFS time or not. In case it is determined that the wireless medium (WM) is idle for the SIFS time, then in step 661, getting the number of time slots already sensed (N) as idle by non-priority random access process and in step 662, decrementing from M the time slots already sensed (N) as idle (i.e. free) by the non-priority random access process and continue channel sensing for the remaining time slots, if needed. In case it is determined that the wireless medium (WM) is not idle for the AIFS time, then in step 651, interrupt (i.e. stop) the random access process until the wireless medium is free and in step 652, continue with the random access. FIG. 6 further illustrates in the branch of the flowchart wherein it is determined that there is wireless medium idle for the SIFS time (in step 640) another determination in step 663, wherein the wireless medium is determined to be considered idle for the AIFS time or not, in case the determination is negative then step 651 is resumed wherein the random access is stopped until the wireless medium is free. In case the determination in step 663 is positive, then in step 664, computing the number of time slots required for back-off counter, say L, and in step 665, decrementing from the BO counter value the number of the remaining non-priority slots already sensed idle, if any left. In step 666, incrementing the back-off counter value of the non-priority access queues by the number of time slots used to decrement the random process of the priority access category. Further, in step 667, it is determined if the wireless medium (WM) is idle for the slot time. In case it is determined that the WM is idle for the slot time, in step 668, continuing the decrement of the back-off counter value of the priority access category. When it is determined in step 669 that the back-off counter value of the priority access category is zero then granting a transmission opportunity in step 671. If it is determined in step 667, that the wireless medium (WM) is not idle for the slot time, then stopping random access until WM is free and resume random access for priority access category queue only in step 670. Furthermore, after the priority packet or packets are served in the transmission opportunity, the random access processes of the non-priority queues resume operation.

Figure 7:
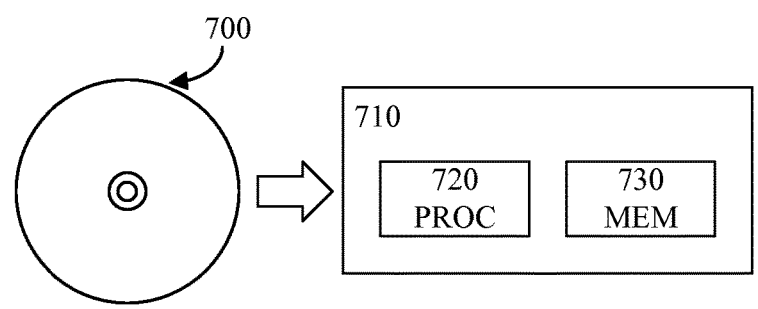
FIG. 7 is a schematic drawing illustrating an example computer readable medium according to some embodiments.

FIG. 7 is a schematic drawing illustrating an example computer readable medium according to some embodiments. More specifically, FIG. 7 illustrates an example computer readable medium in the form of a compact disc (CD) ROM 700. The computer readable medium has stored thereon a computer program 710 comprising program instructions. The computer program is loadable into a data processor PROC 720, which may, for example, be comprised in a network node, an access point (AP) in a WLAN radio network, or an end device. When loaded into the data processing unit, the computer program may be stored in a memory MEM 730 associated with or comprised in the data-processing unit.

Figure 8:
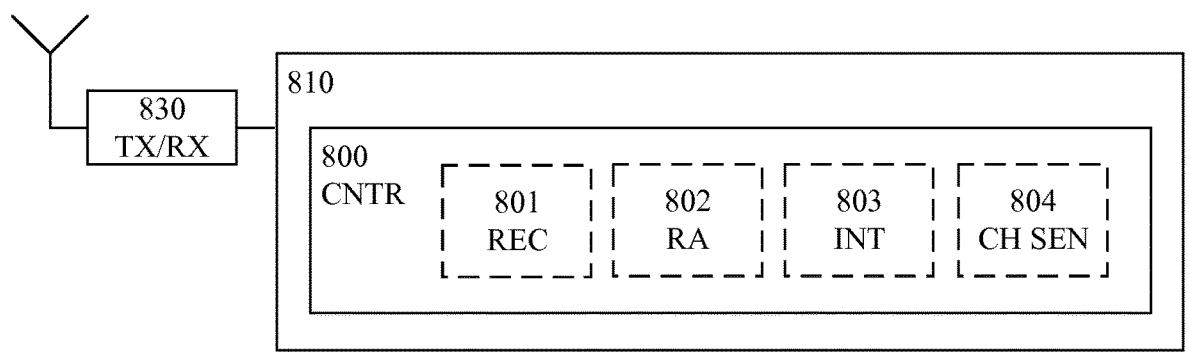
FIG. 8 is a schematic block diagram illustrating an example arrangement according to some embodiments.

FIG. 8 is a schematic block diagram illustrating an example arrangement according to some embodiments. More specifically, FIG. 8 illustrates an example arrangement 810 of an apparatus for prioritization in a random access procedure comprising a receiving arrangement REC 801, e.g. receiving circuitry or a receiving module, configured to receive packets and/or packet flows, a random access arrangement RA 802, e.g. random access circuitry or a random access module, configured to perform random access, an interruption arrangement INT 803, e.g. interruption circuitry or interruption module, configured to interrupt random access of non-prioritized access category queues and a channel sensing arrangement CH SEN 804, e.g. channel sensing circuitry or a channel sensing module, configured for channel sensing. The arrangement 810 is further connected to transmitting means 830.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node, an access point (AP) in a WLAN radio network, or an end device.

Embodiments may appear within an electronic apparatus (such as a network node, an access point (AP) in a WLAN radio network, or an end device) comprising arrangements, circuitry, and/or logic according to any of the embodiments described herein. Alternatively or additionally, an electronic apparatus (such as a network node, an access point (AP) in a WLAN radio network, or an end device) may be configured to perform methods according to any of the embodiments described herein.

According to some embodiments, a computer program product comprises a computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC) 720, which may, for example, be comprised in a network node, an access point (AP) in a WLAN radio network, or an end device 710. When loaded into the data processing unit, the computer program may be stored in a memory (MEM) 730 associated with or comprised in the data-processing unit. According to some embodiments, the computer program may, when loaded into and run by the data processing unit, cause execution of method steps according to, for example, any of the methods illustrated in FIGS. 1-6 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A prioritization method for random access, the method comprising:
    receiving a first packet flow for transmission, wherein the first packet flow is assigned a respective access category queue;
    initiating a random access procedure for the first packet flow;
    receiving a packet of a second packet flow for transmission, wherein the second packet flow is assigned an access category queue having priority over the access category queue assigned to the first packet flow;
    issuing an indication configured to interrupt the random access procedure for the first packet flow; and
    performing a random access procedure for the received packet of the second packet flow, wherein idle time slots previously sensed by the random access procedure for the first packet flow are considered as sensed also for the random access procedure for the second packet flow,
    wherein issuing the indication configured to interrupt the random access procedure of the first packet flow is performed responsive to receiving the packet of the second packet flow.

2. The method according to claim 1, further comprising performing additional channel sensing if further idle time slots are needed.

3. The method according to claim 2, wherein channel sensing comprises a Listen-before-talk, LBT, procedure or a Clear Channel Assessment, CCA, procedure.

4. The method according to claim 1, wherein performing the random access procedure for the received packet of the second packet flow further comprises:
    determining a number of time slots required to be idle during a time interval before a back-off time for the random access procedure for the second packet flow;
    obtaining a number of idle time slots previously sensed by the random access procedure for the first packet flow; and
    decrementing the number of time slots required to be idle by the number of idle time slots previously sensed.

5. The method according to claim 4, wherein performing the random access procedure for the received packet of the second packet flow further comprises:
    determining a number of time slots for a back-off counter value of the second packet flow;
    decrementing, from the number of time slots for the back-off counter value of the second packet flow, by remaining sensed idle time slots;
    incrementing a back-off counter value of the first packet flow with the number of time slots used to decrement the random access procedure for the second packet flow;
    continuing decrement of the back-off counter value of the second packet flow when sensed time slot is considered as idle; and
    granting a transmission opportunity when the back-off counter value of the second packet flow is zero.

6. The method according to claim 5, wherein performing the random access procedure for the received packet of the second packet flow further comprises:
    limiting the increment of the back-off counter of the random access procedure for the first packet flow by the maximum number of time slots previously sensed idle.

7. The method according to claim 1, further comprising resuming random access procedures for the first packet flow once the second packet flow has been processed.

8. The method according to claim 1, wherein the random access procedure comprises a contention-based random access procedure.

9. The method according to claim 1, wherein the first and second packet flows originate from a time sensitive networking, TSN, traffic flow.

10. The method according to claim 1, wherein the method is implemented in a Wireless Local Area Network, WLAN, radio network.

11. A prioritization method for random access, the method comprising:
    receiving a packet of a second packet flow for transmission, wherein the second packet flow is assigned an access category queue having priority over an access category queue assignable to a first packet flow;
    performing a random access procedure for only the received packet of the second packet flow;
    receiving the first packet flow; and
    responsive to receiving the packet of the second packet flow, preventing interruption by the received first packet flow of the random access procedure for the received packet of the second packet flow.

12. An apparatus for prioritization in a random access procedure, the apparatus comprising controlling circuitry configured to cause:
    reception of a first packet flow for transmission, wherein the first packet flow is assigned a respective access category queue;
    initiation of a random access procedure for the first packet flow;

reception of a packet of a second packet flow for transmission, wherein the second packet flow is assigned an access category queue having priority over the access category queue assigned to the first packet flow;

issuance of an indication configured to interrupt the random access procedures for the first packet flow; and performance of a random access procedure for the received packet of the second packet flow, wherein idle time slots previously sensed by the random access procedure for the first packet flow are considered as sensed also for the random access procedure for the second packet flow, wherein the controlling circuitry is configured to cause the issuance of the indication configured to interrupt the random access procedures of the first packet flows in response to reception of the packet of the second packet flow.

13. The apparatus according to claim 12, wherein the controlling circuitry is further configured to cause performance of additional channel sensing if further idle time slots are needed.

14. The apparatus according to claim 12, wherein the controlling circuitry is configured to cause the random access procedure for the received packet of the second packet flow by causing:

determination of a number of time slots required to be idle during a time interval before a back-off time for the random access procedure for the second packet flow;

obtainment of a number of idle time slots previously sensed by the random access procedures for the first packet flow; and decrement of the number of time slots required to be idle by the number of idle time slots previously sensed.

15. The apparatus according to claim 12, wherein the controlling circuitry is configured to cause the random access procedure for the received packet of the second packet flow by causing:

determination of a number of time slots for a back-off counter value of the second packet flow;

decrement, from the number of time slots for the back-off counter value of the second packet flow, by remaining sensed idle time slots;

increment of a back-off counter value of the first packet flow with the number of time slots used to decrement the random access procedure for the second packet flow;

continuation of decrement of the back-off counter value of the second packet flow when sensed time slot is considered as idle; and grant of a transmission opportunity when the back-off counter value of the second packet flow is zero.

16. The apparatus according to claim 12, wherein the controlling circuitry is configured to cause the random access procedure for the received packet of the second packet flow by causing:

limitation of the increment of the back-off counter value of the random access procedure for the first packet flow by the maximum number of time slots previously sensed idle.

17. The apparatus according to claim 12, wherein channel sensing comprises a Listen-before talk, LBT, procedure or a Clear Channel Assessment, CCA, procedure.

18. The apparatus according to claim 12, wherein the controlling circuitry is further configured to cause resumption of random access procedures for the first packet flow once the second packet flow has been processed.

19. The apparatus according to claim 12, wherein the random access procedure comprises a contention-based random access procedure.

20. The apparatus according to claim 12, wherein the first and second packet flows originate from a time sensitive networking, TSN, traffic flow.

21. The apparatus according to claim 12, wherein the controlling circuitry is further configured for implementation in a Wireless Local Area Network, WLAN, radio network, wherein the controlling circuitry comprises:

buffers for reception of packet flows;

one or more transmitters for transmitting packets; and one or more receivers for channel sensing.

22. An apparatus for prioritization in a random access procedure, the apparatus comprising controlling circuitry configured to cause:

reception of a packet of a second packet flow for transmission, wherein the second packet flow is assigned an access category queue having priority over an access category queue assigned to a first packet flow;

performance of a random access procedure for only the received packet of the second packet flow;

reception of the first packet flow; and responsive to the reception of the packet of the second packet flow, prevention of interruption by the received first packet flow of the random access procedure for the received packet of the second packet flow.

* * * * *